Feb. 22, 1949.  M. D. THOMAS  2,462,293
AUTOMATICALLY MEASURING CONCENTRATIONS OF GASES
Filed April 8, 1943  4 Sheets-Sheet 2
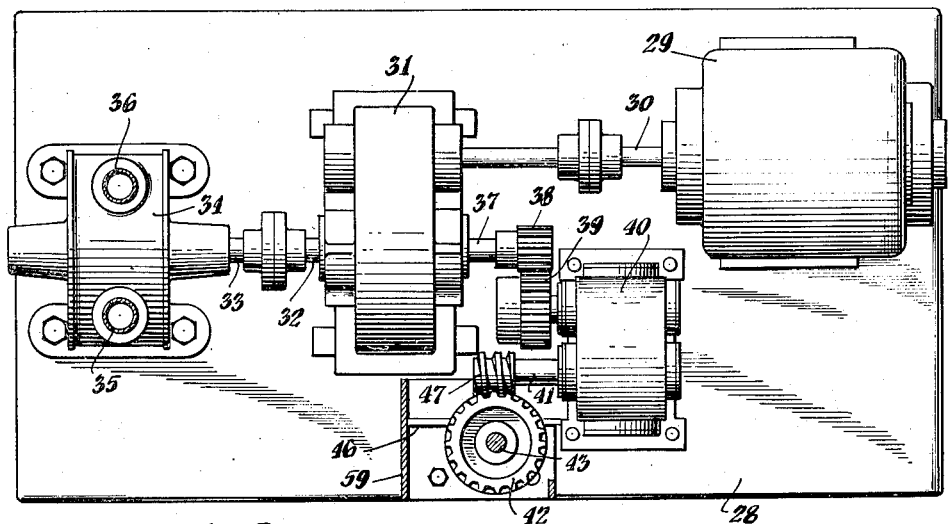
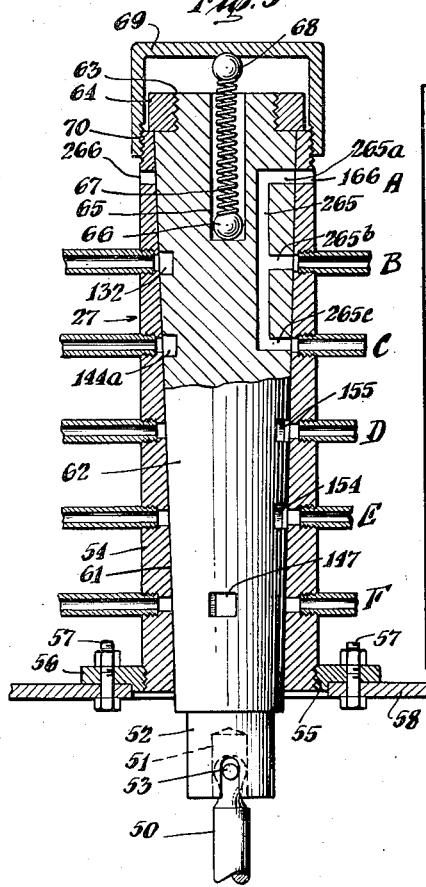
INVENTOR.
Moyer D. Thomas
BY
Furman Rinehart
ATTORNEY Feb. 22, 1949.   M. D. THOMAS   2,462,293
AUTOMATICALLY MEASURING CONCENTRATIONS OF GASES
Filed April 8, 1943   4 Sheets-Sheet 3
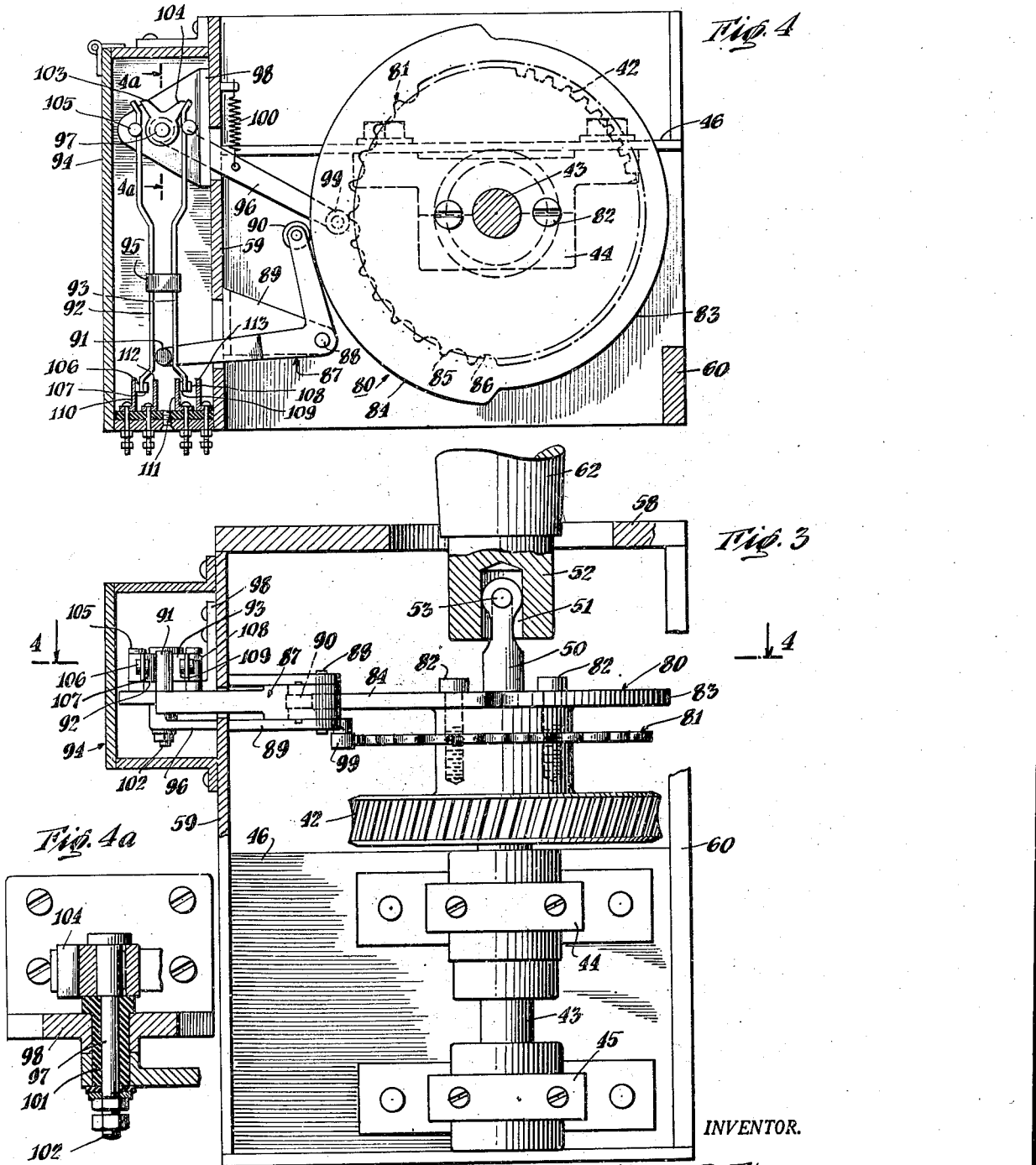
INVENTOR.
BY Moyer D. Thomas
Furman Rinehart
ATTORNEY

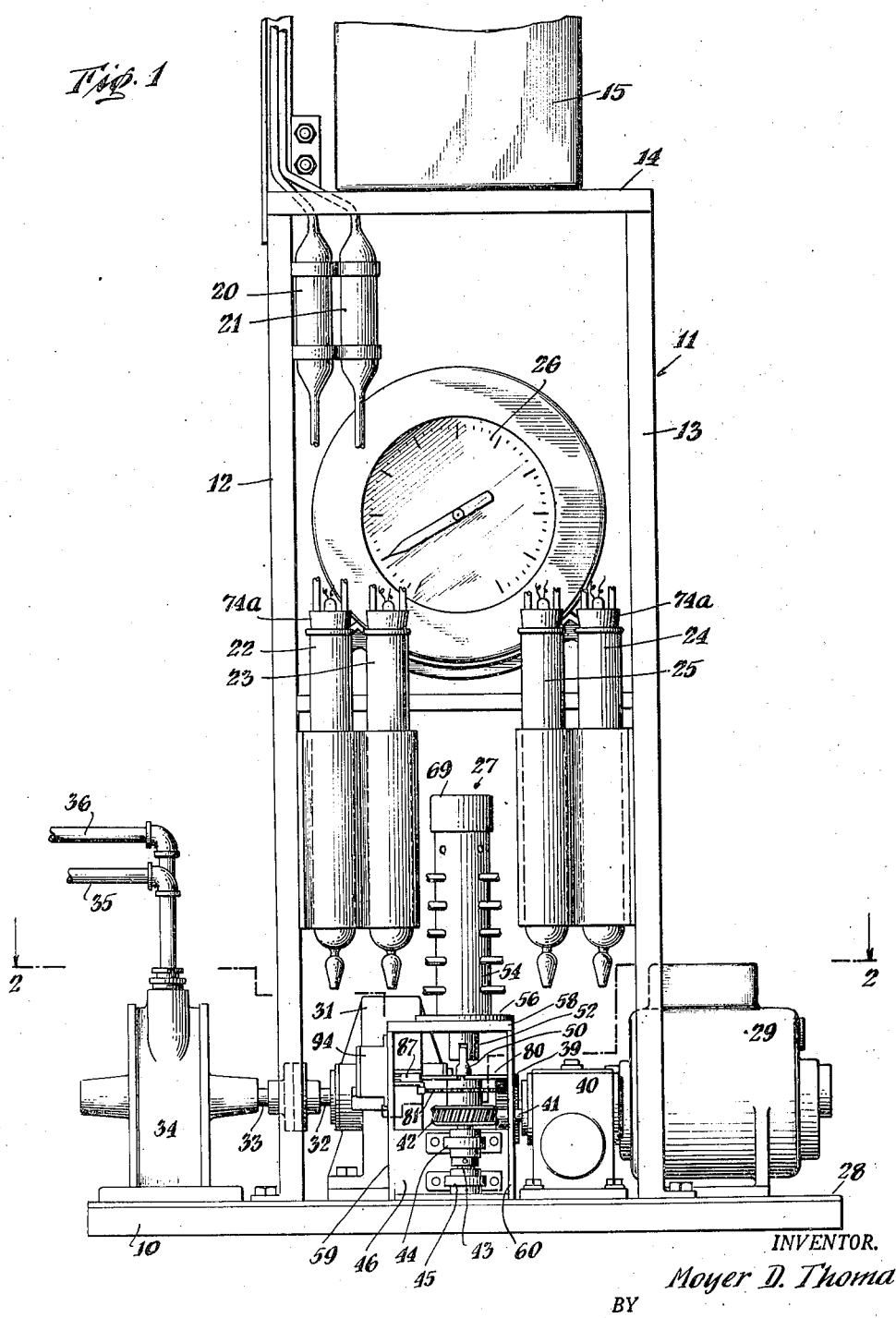

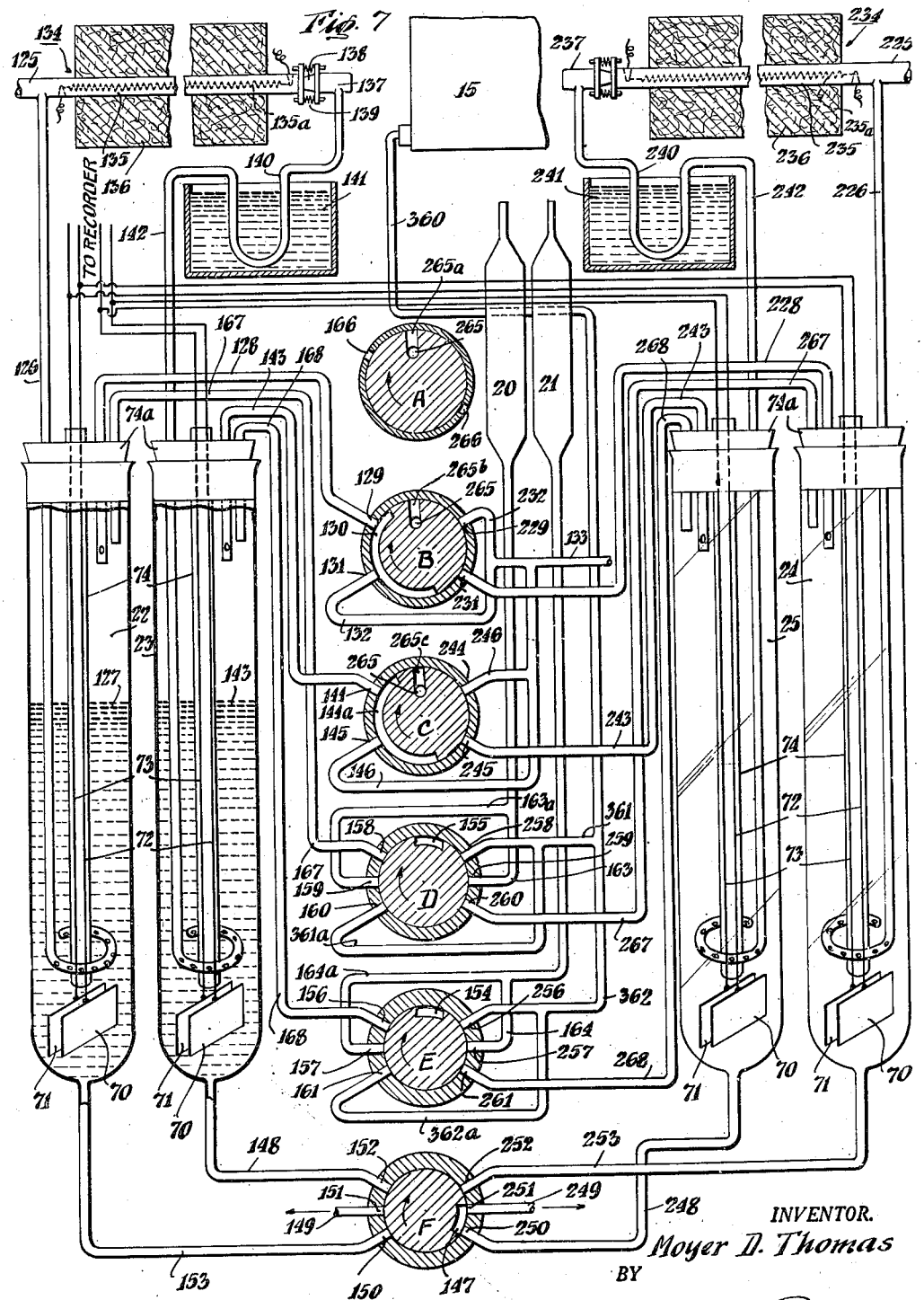

Patented Feb. 22, 1949

2,462,293

UNITED STATES PATENT OFFICE 2,462,293

AUTOMATICALLY MEASURING CONCENTRATIONS OF GASES

Moyer D. Thomas, Salt Lake City, Utah, assignor to American Smelting and Refining Company, New York, N. Y., a corporation of New Jersey Application April 8, 1943, Serial No. 482,355

9 Claims. (Cl. 23—232)

1

This invention relates to the measurement of small concentrations of gases and more particularly to apparatus commonly called autometers.

The invention provides apparatus and method adapted for determination of total volatile sulphur compounds in gases, more particularly, in the air or atmosphere. The system also has application to the determination of other organic compounds; for example, chlorine compounds, such as chloroform, carbon tetrachloride, chlorobenzine and the like, when they exist as mixtures in the air in small concentrations.

According to an embodiment of the invention for determination of total volatile sulphur in the air there is provided apparatus which may be mounted on a suitable frame. The raw air stream which contains small concentrations of sulphur compounds such as sulphur dioxide, and other volatile sulphur compounds such as, hydrogen sulphide, ethyl mercaptan, thiophenol, and thiophene and the like, which may be oxidized to sulphur dioxide, is divided into two separate streams. One stream is passed through a suitable absorber which measures only the sulphur dioxide in the air; the other stream is passed through a suitable combustion device wherein all of the volatile sulphur compounds are converted to sulphur dioxide, after which this stream is passed through another absorber which measures the sulphur dioxide originally in the raw air plus the sulphur dioxide resulting from the conversion of the other volatile sulphur compounds. Consequently, the first of the pair of absorbers measures, and by means of a suitable calibrated recording device, records only sulphur dioxide originally present in the raw air and the second of the pair of absorbers measures, and by means of the recording device, records the total volatile sulphur. Hence, by difference both the concentration of sulphur dioxide in the air and the sulphur dioxide resulting from other sulphur compounds may be determined simultaneously.

In accordance with a preferred form of apparatus there are provided two pairs of such absorbers, a pair of pipettes for measuring predetermined quantities of a suitable absorbent solution, a container for a supply of absorbent and a special control valve of the stop cock type through which the various pipettes and absorbers are connected whereby as one pair of absorbers is in gas aspirating operation the other pair is drained and refilled with absorbent solution drawn from the stock supply in measured quantities through the pipettes preparatory to the aspiration of gas through that pair of absorbers. By special con-

2 struction of the control valve and the mechanism for operating it, together with a suitable power circuit and switch arrangement connected with a recorder to record conductivity of the absorbent reagent, a continuous or running record of the content of both sulphur dioxide and other volatile sulphur compounds in the air may be produced.

In addition to an improved method and system of determining small concentrations of the various volatile organic compounds in gases, the invention also consists in certain new and original features of construction and combinations of parts hereinafter set forth and claimed.

Although the novel features which are believed to be characteristic of this invention will be particularly pointed out in the claims appended hereto, the invention itself, as to its objects and advantages, and the manner in which it may be carried out, may be better understood by referring to the following description taken in connection with the accompanying drawings forming a part thereof, in which Fig. 1 is a front view in elevation showing an assembled machine embodying the invention, being, however, in somewhat abbreviated and somewhat diagrammatic form for simplification of illustration;

Fig. 2 is a view on line 2—2 of Fig. 1 showing certain parts mounted on the base plate of the machine;

Fig. 3 is a view in elevation, partly in section and to larger scale of the shaft for rotating the control valve stem, cams and switch mechanisms for controlling the circuit to the recorder.

Fig. 4 is a view on line 4—4 of Fig. 3;

Fig. 4a is a view on line 4a—4a of Fig. 4;

Fig. 5 is a view in cross section of the main control valve;

Fig. 6 is a diagrammatic view or wiring diagram illustrating the transfer of the recorder circuit to the various absorbers, and Fig. 7 is a diagrammatic illustration of the apparatus assembly in the nature of a flow diagram.

In the following description and in the claims, various details will be identified by specific names for convenience, but they are intended to be as generic in their application as the art will permit.

Like reference characters denote like parts in the several figures of the drawings.

Referring now to the drawings, it will be observed that the various elements of the apparatus may be mounted on a suitable base 10 which supports a frame or cabinet 11 (see Fig. 1). The cabinet may comprise upstanding structural members or side walls 12 and 13 and a cross piece 14 providing a table upon which to support a supply bottle 15. The supply bottle provides a reservoir for a suitable absorbent solution, such as, distilled water or acidulated water to which may be added hydrogen peroxide. Inasmuch as proper and suitable absorbents are well known in this art, further elaboration is deemed unnecessary.

The frame 11 provides suitable means for mounting the pipettes 20 and 21, the two pairs of absorbers 22, 23 and 24, 25, a gas meter 26 for measuring the volume of gas passed through the absorbers, and also other light parts such as connecting conduits, combustion device and the like described in further detail hereinafter. It will be understood, of course, that these parts may be mounted in various ways and positions, the assembly shown being merely illustrative. It is important, however, that the various pipettes, chambers, and absorbers be so mounted that liquid may gravitate from them through the valve 27 which is described in more detail hereinafter.

The base 10 supports a bed plate 28 upon which is mounted a prime mover such as a motor 29, the shaft 30 of which is drivingly connected to a speed reducer 31. The speed reducer 31 is provided with a shaft 32 drivingly connected to the shaft 33 of a rotary gas pump 34. Air containing the volatile sulphur compounds is drawn into the intake 35 and discharged under suitable pressure from the discharge side of the pump through the conduit 36 and finally through suitable conduits through the absorbers as described in further detail hereinafter. Or, if desired, the suction side of the pump may be connected to the discharge side of the meter to draw the air to be tested through the system.

The speed reducer 31 is also provided with a shaft 37 drivingly connected through a pinion 38 and gear 39 to a second speed reducer 40. Speed reducer 40 is provided with a shaft 41 mounting a worm 47 which in turn meshes with a worm gear 42. The worm gear 42 is fixedly mounted on a vertical shaft 43, in turn journalled for rotation in bearings 44 and 45 secured to a vertical structural member 46 fixed to the bed plate 28.

A universal drive pin 50 is connected to the upper end of shaft 43. The upper end of drive pin 50 is mounted in a bore 51 in the lower end of the valve plug 52 of the valve 27. A pin 53 through the valve plug and universal drive pin 50 drivingly connects the valve plug and pin 50 which in turn is connected to the rotatable shaft 43.

The body 54 of the valve 27 is externally threaded at its lower end 55 into an internally threaded flanged ring 56 which in turn is secured, as by means of bolts 57, to a table 58 which is supported by structural members 59 and 60 secured to the bed plate 28.

The control valve itself (see Fig. 5) comprises a relatively long body or casing 54 having an internal tapered bore 61 in which the correspondingly tapered valve plug 62 snugly but rotatably fits. The upper end of the plug 62 has a threaded neck portion 63 accommodating an internally threaded adjusting collar 64 so that a minimum clearance may be maintained to prevent the surfaces from binding. A socket 65 in the upper end of the plug or core 62 accommodates a ball 66 and a spring 67 which also maintains a second ball 68 in an appropriate socket in the cap 69.

The cap 69 is internally threaded and may be adjustably screwed on the upper externally threaded portion 70 of the valve body. The valve may be constructed of stainless steel and bronze or bronze and brass, or other suitable material, and by the use of heavy stop cock grease, surface binding is avoided.

For convenience of description it may be said that the control valve 27 has six planes (indicated in Figs. 5 and 7); and designated as planes A, B, C, D, E and F. In each plane the body 54 has a plurality of outlets or ports which may accommodate conduits connecting with other parts of the apparatus. And the plug 62 is provided in each plane with a groove or connecting channel as shown in Figs. 5 and 7. Also, as shown somewhat diagrammatically in Fig. 7, the ports of the valve are connected by suitable conduits for attaching rubber hose, glass tubing, or other suitable conduits to their respective chambers, etc.

The body of the valve being vertically and rigidly mounted on the table 58 permits of rotation of the plug 62 by means of the reduction gear system with which it is connected by means of the universal drive pin 50, the latter allowing the core or plug 62 to remain centered in its seat in the valve body.

While it will be a matter of choice, dependent upon the particular job at hand, it is preferred to design the gear system to rotate the valve plug 62 about one revolution per hour, as this will permit an absorption or aspirating period of about thirty minutes for each pair of absorbers alternately and allows of sufficient time to drain and recharge the other pair of absorbers with fresh solution while the other pair is in aspirating operation.

For measuring the effect on the conductivity of the reagent or absorbent by the gas to be tested, each absorber is provided with a pair of electrodes through which current is passed, the amount of which may be indicated by a suitable recording meter (not shown). The electrodes are indicated by 70 and 71 suitably connected to leads 72 and 73 extending through a glass tube 74 sealed at its lower end. Each pair of electrodes is connected through an electrical circuit as indicated in the wiring diagram (Fig. 6). Tubes 74 extend through stoppers 74a in the upper ends of the absorbers.

As shown by the wiring diagram (Fig. 6), there is an arrangement for alternately connecting the recording meter (not shown) first to one pair of absorbers 22 and 23 during their period of aspiration and then to the other pair of absorbers 24 and 25 during their period of aspiration. Also, when the recorder is connected to one pair of absorbers, that is during a half revolution of valve plug 62, the arrangement is such that the flow of current is alternated first through the electrodes of one and then the other of that pair of absorbers so as to record periodically and at short intervals the conductivity of the reagent in each during the aspiration period.

Mechanism for this purpose comprises mechanically operated switches which may be better understood by reference to Figs. 3 to 6, inclusive. Mounted for rotation with shaft 43 is a cam 80 and a toothed gear 81 which may be secured to the hub of the worm gear 42 as by means of screws 82. It will be noted that cam 80 has a low track 83 through an arc corresponding to half the periphery and a high track 84 throughout its remaining half. The tooth gear 81 is provided in this instance with 30 teeth, each tooth having a peak 85 and a valley 86.

Cooperating with cam 80 is a cam follower which comprises an angular lever 87 pivotally mounted on pivot pin 88 on a bracket 89 secured to frame member 59. One end of the lever 87 is provided with a cam roller 90 engaging the cam track of cam 80. The other end of the lever is provided with an insulated pin 91 which engages a pair of switch arms 92 and 93 mounted in a switch box 94. The switch arms may be constructed of suitable conducting springy material and may be maintained in spaced relation by means of a clamp 95.

Cooperating with tooth gear 81 is a follower lever 96 pivotally mounted on a conductor pin 97 fixed to a bracket 98 secured to frame member 59. One end of lever 96 is provided with a cam roller 99 which engages the cam track provided by the peaks 85 and valleys 86 of the tooth gear 81. It will be noted that a small spring 100 urges the roller 99 into cooperative engagement with the cam track of tooth gear 81. The conductor pin 97 is insulated from the bracket by means of an insulator sleeve 101. The lower end of the pin 97 provides a connector post 102.

Fixed to the lever 96 to rotate with the lever about the pivot 97 is a Y-shaped contactor having contact arms 103 and 104; the contact arms being adapted to contact switch arm 92 when cam roller 99 engages a valley 86 of the cam track of gear 81 and to contact switch arm 93 when the roller 99 is moved outwardly on the peaks of the same cam track. Insulated stops 105 are provided to limit undue spread of switch arms 92 and 93.

The other ends of the switch arms 92 and 93 are provided with contact members 106, 107, and 108, 109. Contactor 106 is adapted to make contact with connector post 110 and contactor 109 to make contact with connector post 111 when the cam roller 90 is in cooperating engagement with the high side 84 of the cam track of the cam 80, while contactors 107 and 108 make contact with connector posts 112 and 113 respectively when cam roller 90 engages the low side 83 of the cam track.

It will be understood, of course, that wires are connected to the connector posts 102, 110, 112, 111, 113 and the leads 72 and 73 as indicated in the wiring diagram. And it will be apparent from the foregoing explanation that when the pair of absorbers 22 and 23 are in aspirating operation, current flows to the recording meter alternately through absorbers 22 and 23; first through the circuit comprising wires 115, switch arm 92, absorbers 22, wire 117 and wire 118 through the recorder (not shown); then when Y member 103, 104 is switched over by the lever engaging the cam track of gear 81, current flows through the circuit comprising wire 115, switch arm 93, wire 119, absorber 23, wire 117 and wire 118 through the recorder. It will be apparent that current flows through similar circuits through wires 120, 121 and 122 when absorbers 24 and 25 are in aspirating operation, since the switch arms are caused to engage posts 112 and 113 and the current is passed alternately through absorbers 24 and 25. A suitable source of 60-cycle A. C. current is supplied at the recorder.

As pointed out hereinbefore, the gear reduction system in this embodiment shown for illustration is designed to rotate the valve plug 62 one revolution per hour. Hence, as described in further detail hereinafter, the pair of absorbers 22 and 23 are in aspirating operation for approximately one half hour and then the pair of absorbers 24 and 25 are in aspirating operation for the alternate half hour period. Consequently, inasmuch as gear wheel 81 has 30 peaks and a corresponding number of valleys, each absorber in each pair records a reading each minute during its aspiration period of thirty minutes.

To explain in further detail the assembly and operation of the system, reference may be had to Fig. 7 in connection with the foregoing description. Assuming that it is desired to determine sulphur dioxide and also total volatile sulphur occurring in small concentrations in the air, the raw air may be drawn into the apparatus through conduits 125 and 225. Inasmuch as the apparatus comprises two similar operating pairs of absorbers operating alternately, each on a half hour aspiration, it will be understood that as air is being drawn through conduit 125, conduit 225 will not be drawing air and vice versa. It will be understood, of course, that the mechanism on the bed plate 28 is in operation; that is, the gas pump 34 is drawing the air to be tested through the system and valve plug 62 of the valve 27 is rotating at one revolution per hour. Consequently, cam 80 is providing current to absorbers 22 and 23 during the aspirating period of one half hour and then to absorbers 24 and 25 the next half hour. And during the aspiration period of each pair, current is flowing alternately at minute intervals through each absorber in the pair, for recording by the recording meter.

The air passing through conduit 125 is divided into two streams, one passing directly into absorber 22 through the conduit from which it bubbles through the measured quantity of absorbent solution which has previously been charged to the absorber. The residual air stream from absorber 22 then passes through conduit 128 through port 129 in plane B of the valve body through groove 130 of the valve plug 62, through port 131, through conduit 132, through conduit 133, through the gas meter (not shown in Fig. 7).

The other part of the divided stream of air is passed through the combustion device designated generally by reference character 134. The combustion device comprises a combustion chamber having disposed therein an electrical heat resistant element. The combustion chamber may be constructed of a silica tube 135 of desired length which may be 25 mm. cross section. The outside of the silica tube should be well insulated with some suitable heat insulator 136 such as rock wool. Mounted internally of the combustion tube 135 is a spirally wound length of platinum wire 135a which is connected in circuit with a suitable source of electric current (not shown) to cause the spiralled platinum wire to glow inside the combustion tube. Mounted on the discharge or hot end of the combustion tube 135 is an adapter 137 which may be of heat resisting glass (such as Pyrex glass) provided with a ground joint 138 engaging a ground socket in the end of the combustion tube, two parts being held together in leak-proof engagement by means of a spring clamp 139. The gas stream passing through the adapter is cooled by leading the conduit 140 through a water bath 141. The adapter conduit 140 is connected to conduit 142 which extends into the absorbent solution 143, which has been previously charged to absorber 23 in measured quantity.

As the air passes through the combustion tube 134 over and in contact with the glowing platinum wire, the volatile sulphur compounds not already in the form of sulphur dioxide are converted to sulphur dioxide. The heat serves to oxidize the sulphur compounds to SO₂, the reaction being partly at least a pyrolysis since carbonaceous material gradually deposits beyond the heater. However, this is not sufficient to cause difficulty and can be removed when occasion requires. Of course, the temperature of the gas leaving the combustion tube may vary depending upon concentrations and amount of current passed through the platinum wire. In any event, sufficient temperature is maintained to convert all volatile sulphur compounds to SO₂. At a temperature of around 580° C. this may be accomplished in the cases of tests that have been run. The gas stream should be cooled by the adapter so as not to result in undue evaporation of solution in the absorber but not so much as to cause condensation.

The oxidized gas stream which for convenience may be termed the "total sulphur stream" is then passed through conduit 142 from which it is bubbled through solution 143 in absober 23. From this absorber the stream passes through conduit 143 through port 144 in plane C of the valve body, through groove 144a, through port 145, then through conduit 146, through conduit 133 to the meter (not shown in Fig. 7).

In the meantime, as the valve plug 62 is rotating (in clockwise direction) groove 147 in plane F of the valve connects absorber discharge conduit 248 with drain conduit 249, through ports 250 and 251 to drain out the solution from absorber 25, the solution in absorber 24 having been drained out as the groove 147 passed the ports 252 and 251 connecting absorber discharge conduit 253 with drain conduit 249.

After the trailing edge of groove 147 of plane F of the valve has passed port 250, groove 154 of plane E will connect ports 256 and 257 and groove 155 of plane D of the valve will connect ports 258 and 259. This causes a measured and predetermined quantity of stock absorbent solution to pass from the supply bottle 15 through conduits 360, 361 and 362, 163 and 164 into pipettes 20 and 21.

Next, the valve plug in its rotation will cause groove 155 in plane D to connect ports 259 and 260 and groove 154 will simultaneously connect ports 257 and 261 in plane E. At the same time the vent bores 265, 265a, 265b and 265c in the valve plug 62 will connect port 245 of plane C and port 231 of plane B with vent port 266 in the valve body on plane A. Consequently, a measured quantity of absorbent solution will pass from pipette 20 through conduit 163, port 259, groove 155, port 260 (plane D), conduit 267 into absorber 24. Simultaneously a measured quantity of absorbent solution will pass from pipette 21 through conduit 164, port 257, groove 154, port 261 (plane E) conduit 268 into absorber 25. Absorber 24 is then being vented through conduit 228, port 231 (plane B) bore 265 and vent port 266 (plane A) and simultaneously absorber 25 is being vented through conduit 243, port 245 (plane C) and vent port 266 (plane A).

In the meantime, aspiration has been proceeding in absorbers 22 and 23 and alternate minute recordings of the conductivity of the reagent in each is being made by the recorder. Also, it will be observed from the foregoing explanation and reference to Fig. 7 that groove 130 will have connected ports 129 and 229 in plane B of the valve 27 and groove 144a will have connected ports 144 and 244 in plane C. Port 229 connects conduit 232 to conduit 133 to the meter and port 244 connects conduit 246 to conduit 133 to the meter.

The aspiration period of absorbers 22 and 23 will take up one half revolution of plug 62 of the control valve and during that time cam follower 90 is engaging the cam track of cam 80 on the high side 84 to supply current to that pair of absorbers during the aspiration period. In the meantime cam follower 99 is engaging the cam track of tooth gear 81 to alternate the current flow between absorbers 22 and 23 at minute intervals during the aspiration period. Also, during this half revolution of the valve plug it will have been noted that absorbers 24 and 25 have not been in aspirating operation, but will have been drained and refilled with measured quantities of stock absorbent solution.

During the next half revolution of the valve plug 62 the same sort of operation proceeds, it being apparent, of course, from the foregoing explanation, that absorbers 24 and 25 are in aspirating operation while absorbers 22 and 23 are being drained and refilled with measured quantities of absorbent solution. During this half of the cycle the cam follower 90 is engaging the low side 83 of cam 80 to supply current to absorbers 24 and 25, while cam follower 99 engages the cam track of tooth gear 81 to alternate the flow of current between these absorbers at minute intervals. During this half cycle the air to be tested is drawn through combustion conduit 234 like combustion unit 134, through the adapter 237 and conduit 240, and 242 into absorber 25, raw air being drawn through conduit 226 into absorber 24.

While two combustion units have been shown in the assembly of Fig. 7 one of them may be dispensed with, if desired, by connecting conduit 126 with a branch conduit connecting with conduit 226 and connecting conduit 142 with a branch conduit connecting with conduit 242.

During the half cycle when aborbers 24 and 25 are in aspirating operation, groove 130 of valve plug 62 (plane B) connects first port 229, and port 231, and then port 231 and port 131 to aspirate absorber 24 through conduits 228, 232 and 133 and then conduits 228, 132 and 133. Simultaneously, groove 144a (plane C) connects first port 244 and port 245 and then port 245 and port 145 to aspirate absorber 25 through conduits 243, 246 and 133 and then conduits 243, 146 and 133, the latter being connected to the meter (not shown in Fig. 7 but shown in Fig. 1.)

Also, during this half cycle, groove 147 of plug 62 (plane F) connects ports 150 and 151 to drain absorber 22 through conduits 153 and 149 and then groove 147 connects ports 151 and 152 to drain absorber 23 through conduits 148 and 149. Then groove 154 of plug 62 (plane E) connects ports 161 and 157 to draw reagent from bottle 15 through conduits 360, 362, 362a, ports 161 and 157, conduit 164a into pipette 21. And simultaneously groove 155 (plane D) connects ports 160 and 159 to draw reagent from bottle 15 through conduits 360, 361, 361a, ports 160 and 159, and conduit 163a into pipette 20. Then groove 154 connects ports 157 and 156 to transfer the reagent from pipette 21 to absorber 23 through conduit 168 and groove 155 connects ports 159 and 158 to transfer the reagent from pipette 20 to absorber 22 through conduit 167. During the transfer of the reagent, the absorbers are vented through vent bores 265a, b and c, through vent port 166.

It will now be seen that the apparatus provides a system which is continuous; the cycle of operations may be continued for as long a period as may be desired. The recording instrument makes minute recordings of the conductivity of the reagents in the absorbers as the aspiration proceeds and when calibrated in a manner known in the art, will indicate and record not only the $SO_2$ in the air in small concentrations but also total volatile sulphur compounds in the air.

Moreover, the system is adapted to determination of small concentrations of organic chlorine compounds such as chloroform, carbon tetrachloride, ethylene chloride and the like, which can be oxidized to hydrochloric acid by suitable adjustment of combustion temperature in the combustion chamber or tube. Other applications of the system will suggest themselves to those skilled in the art.

While certain novel features of the invention have been disclosed and are pointed out in the annexed claims, it will be understood that various omissions, substitutions and changes may be made by those skilled in the art without departing from the spirit of the invention.

What is claimed is:

1. In apparatus for automatically measuring concentrations of volatile compounds in gases, a pair of absorbers, a first conduit connected to a first of said pair of absorbers to pass a stream of raw gas to be tested directly into said first of said absorbers, a combustion chamber, a second conduit connected to said combustion chamber through which to pass another stream of said raw gas to oxidize volatile compounds contained therein, a third conduit connected to said combustion chamber and the second of said pair of absorbers to pass said oxidized stream into the second of said absorbers, a container for a source of absorbent solution, means including a valve connecting said container and absorbers to pass measured quantities of said solution into said absorbers, means associated with said apparatus to cause said streams to pass through the solutions in said absorbers, and means to determine the conductivity of the solutions in said absorbers.

2. In apparatus for automatically measuring concentrations of volatile compounds in gases, a pair of absorbers, a conduit connected to a first of said absorbers to pass a stream of raw gas directly into said first of said absorbers, a combustion chamber through which to pass another stream of said raw gas to oxidize volatile compounds contained therein, a second conduit connecting said combustion chamber and the second of said absorbers to pass said oxidized stream into said second of said absorbers, a container for a source of absorbent solution, a pair of pipettes, means including conduits connected with said pipettes and said container operative automatically to feed a measured quantity of said solution into each of said pipettes and then to feed the solution from one of said pipettes to one of said absorbers and the solution from the other of said pipettes to the other of said absorbers, means to aspirate the raw gas stream through the solution in said first absorber and the oxidized stream through the solution in said second absorber, and means to determine the conductivity of the solutions in said absorbers.

3. In apparatus for automatically measuring concentrations of volatile compounds in gases, a first conduit for withdrawing a stream of gas from the source of raw gas to be tested, a pair of absorbers, a second conduit connected to said first conduit to pass a part of said stream of raw gas directly into one of said absorbers, a combustion chamber connected to said first conduit through which to pass another part of said stream of raw gas to oxidize volatile compounds contained therein, an adapter connected to said combustion chamber, a cooling means connecting said adapter to cool the gas stream discharged from the combustion chamber, a third conduit connected to said cooling means and to the other absorber to pass said cooled oxidized stream into said other of said absorbers, a container for a source of absorbent solution, a pair of pipettes, means including a valve and conduits connected with said pipettes and said container automatically to feed a measured quantity of said solution into each of said pipettes and then to feed the solution from one of said pipettes to one of said absorbers and the solution from the other of said pipettes to the other of said absorbers, means associated with said apparatus to aspirate the divided stream through the solutions in said absorbers, and means associated with said apparatus to determine the conductivity of the solutions in said absorbers.

4. In apparatus for measuring concentrations of oxidizable compounds in gases, a combustion device to oxidize said oxidizable compounds, an absorber adapted to contain a quantity of absorbent solution through which to aspirate a stream of gas to be tested, a conduit connecting said combustion device and absorber, means to cause the stream of gas to be tested to pass through said combustion device and then through the solution in said absorber and means associated with said absorber to measure the conductivity of the solution in the absorber, said combustion device comprising an elongate chamber, and an electrical conductive heat resisting element disposed within said chamber adapted to heat said chamber internally and to give off sufficient heat to oxidize the said ozidizable compounds in the gas passed therethrough when a requisite electric current is passed through said element.

5. In apparatus for measuring concentrations of oxidizable compounds in gases, a combustion chamber to oxidize said oxidizable compounds, an adapter connected to said combustion chamber, a cooling means connected to said adapter to cool gas heated in said combustion chamber, an absorber adapted to contain a quantity of absorbent solution through which to aspirate a stream of gas to be tested, a conduit connecting said cooling means and absorber, means to cause the stream of gas to be tested to pass through said combustion device, adapter, cooling means, and conduit and then through the solution in said absorber and means including electrodes disposed within said absorber to measure the conductivity of the solution in the absorber, said combustion chamber comprising an elongate chamber, an electrical conductive heat resisting element disposed within said chamber adapted to heat said chamber internally and to give off sufficient heat to oxidize the said oxidizable compounds in the gas passed therethrough when a requisite electric current is passed through said element, said cooling means including an externally cooled conduit through which the gas from the combustion chamber passes.

6. In a system for automatically measuring concentrations of volatile compounds in gases, a first pair and a second pair of absorbers, each pair consisting of a first and second absorber, a container for a source of reagent, a first and second pipette fed periodically with reagent from said source, plural control valve means between said source and pipettes to feed said reagent to said pipettes and then from said pipettes alternately first to said first pair of absorbers and then to said second pair of absorbers, conduits connecting said container and valve means through which the solution may pass from the container through said valve means, other conduits connecting said valve means and pipettes through which solution may pass to and from said pipettes through said valve means, still other conduits connecting said absorbers and valve means through which solution from said pipettes may pass from said valve means to said absorbers, a combustion device for oxidizing volatile compounds in the gas to be tested, still other conduits connecting said combustion chamber and the second absorbers of each pair of absorbers, and means in said valve means to feed gas to be tested alternately to the two pairs of absorbers, first to feed a portion of said gas to be tested into one of said first pair of absorbers and another portion of said gas through said combustion device into said second absorber of said first pair of absorbers, then to feed a portion of said gas to be tested into one of said second pair of absorbers and another portion of said gas to be tested through said combustion device into said second absorber of said second pair of absorbers.

7. In a system for automatically measuring concentrations of volatile compounds in gases, a first pair and a second pair of absorbers, each pair consisting of a first and second absorber, a container for a source of reagent, a first and second pipette fed periodically with reagent from said source, plural control valve means between said source and pipettes, conduits connecting said container and valve means and other conduits connecting said valve means and pipettes through which the reagent may pass, still other conduits connecting said valve means and absorbers, said valve means and conduits being arranged to feed said reagent to said pipettes and then from said pipettes alternately first to said first pair of absorbers and then to said second pair of absorbers, said first pipette feeding the first of each pair of absorbers and said second pipette feeding the second of each pair of absorbers, a combustion chamber for oxidizing volatile compounds in the gas to be tested, an adapter connected to said combustion device, a cooling means connected to said adapter for cooling the gas from the combustion chamber, conduits connecting said adapter and one of each pair of absorbers, said control valve means being arranged to feed gas to be tested alternately to the two pairs of absorbers, first to feed a portion of said gas to be tested into one of said first pair of absorbers and another portion of said gas through said combustion device into said second absorber of said first pair of absorbers, then to feed a portion of said gas to be tested into one of said second pair of absorbers and another portion of said gas to be tested through said combustion device into said second absorber of said second pair of absorbers.

8. A method for measuring the concentrations of volatile compounds in gaseous mixtures of the character described which includes passing a stream of raw gas through a body of absorbent reagent while measuring the conductivity of the reagent and passing another stream of raw gas from the same source over a glowing electrical heat resistant element in a confined space whereby to oxidize oxidizable volatile compounds, cooling the oxidized stream and then passing the oxidized stream through a second body of absorbent reagent while measuring the conductivity of the second body of reagent.

9. A method of determining the sulphur dioxide and total volatile sulphur content of air containing the same which comprises dividing the air sample to be tested into a first and second stream, passing the first stream through an absorbent reagent while recording the conductivity of the reagent to determine the sulphur dioxide content of the sample, passing the second stream through an internally heated confined space whereby to oxidize all of the volatile sulphur to sulphur dioxide, and then passing the second stream through an absorbent reagent while recording the conductivity of the reagent to determine both the sulphur dioxide originally present in the second stream plus the sulphur dioxide resulting from the oxidation of the other volatile sulphur compounds in the second stream whereby to determine the sulphur dioxide content and the total volatile sulphur content of the sample

MOYER D. THOMAS.

REFERENCES CITED

The following references are of record in the file of this patent:

UNITED STATES PATENTS

| Number | Name | Date |
|---|---|---|
| 854,696 | Jones | May 21, 1907 |
| 1,448,901 | Moreland | Mar. 20, 1923 |
| 1,474,097 | Krogh et al. | Nov. 13, 1923 |
| 1,661,627 | Rodhe | Mar. 6, 1928 |
| 1,681,047 | Porter | Aug. 14, 1928 |
| 1,753,675 | Wasson | Apr. 8, 1930 |
| 1,900,884 | Lusby | Mar. 7, 1933 |
| 2,005,036 | Howe | June 18, 1935 |
| 2,047,526 | Thomas | July 14, 1936 |

FOREIGN PATENTS

| Number | Country | Date |
|---|---|---|
| 309,733 | Germany | Dec. 11, 1918 |
| 359,848 | Germany | Sept. 27, 1937 |
| 464,902 | Great Britain | Apr. 27, 1937 |